United States Patent [19]
Basavanhally et al.

[11] Patent Number: 5,647,044
[45] Date of Patent: Jul. 8, 1997

[54] FIBER WAVEGUIDE PACKAGE WITH IMPROVED ALIGNMENT MEANS

[75] Inventors: Nagesh Ramamoorthy Basavanhally, Trenton; George John Shevchuk, Old Bridge; James Albert Walker, Howell, all of N.J.

[73] Assignee: Lucent Technologies Inc., Murray Hill, N.J.

[21] Appl. No.: 578,001

[22] Filed: Dec. 22, 1995

[51] Int. Cl.$^6$ ..................................................... G02B 6/42
[52] U.S. Cl. ................................................. 385/92; 385/94
[58] Field of Search ........................... 385/92, 88, 94; 257/81, 82, 84, 99, 100

[56] References Cited

U.S. PATENT DOCUMENTS

| | | | |
|---|---|---|---|
| 4,399,453 | 8/1983 | Berg et al. | 385/88 |
| 4,639,077 | 1/1987 | Dobler | 385/92 |
| 4,737,008 | 4/1988 | Ohyama et al. | 385/92 |
| 4,926,545 | 5/1990 | Pimpinella et al. | 385/14 |
| 4,995,695 | 2/1991 | Pimpinella et al. | 385/92 |
| 5,087,949 | 2/1992 | Haitz | 257/79 |
| 5,506,919 | 4/1996 | Roberts | 305/2 |

FOREIGN PATENT DOCUMENTS 0026124  8/1980  France ................................. 385/93

*Primary Examiner*—John D. Lee
*Assistant Examiner*—Ellen Eunjoo Kang
*Attorney, Agent, or Firm*—P. V. D. Wilde

[57] ABSTRACT

The specification describes a molded plastic package for a surface normal optoelectronic device. The package is designed to passively align precisely the optoelectronic device with an optical fiber. Passive alignment is achieved by forming the optoelectronic device in a pyramid shape, and forming an identical pyramid shape in a mating molded plastic cover for the device. The mating pyramid shapes serve to center the optical fiber core precisely over the active optical region of the surface normal optoelectronic device.

7 Claims, 3 Drawing Sheets

FIBER WAVEGUIDE PACKAGE WITH IMPROVED ALIGNMENT MEANS

FIELD OF THE INVENTION

The invention relates to connector packages for interconnecting terminal devices such as transmitters, receivers, modulators etc., to fiber waveguides. It is particularly aimed at low cost optical modulator packages that enable high capacity wavelength division multiplexed networks.

BACKGROUND OF THE INVENTION

In recent years, there has been a great deal of attention paid to the need to upgrade the telephone network and increase the available bandwidth. Traffic on the World Wide Web is growing at over 70% per year, and other such networks are growing even faster. There have been a number of photonic solutions offered that increase the available bandwidth of the telephone network. These solutions range from point to point connections to wavelength division multiplexed passive optical networks systems. The latter solution is very effective in principle, however the cost associated with photonic devices in these systems is an impediment to their acceptance and rapid deployment. Much of this cost is associated with the cost of packaging individual transmitters and receivers.

Recently, proposals for wavelength multiplexed passive systems have been put forth which utilize an optical modulator at the subscriber location to replace the active LED or laser devices that are typically used in prior art systems. See, for example, L. Altwegg, A Azizi, P. Vogel, Y. Wang, and P. Wiler, "LOCNET—a fiber-in-the-loop system with no light-source at the subscriber end", *J. of Lightwave Tech.*, vol. 12, no. 3, pp. 535–540, 1994; also see: N. J. Prigo, P. D. Magill, T. E. Darcie, P. P. Iannone, M. M. Downs, B. N. Desai, U. Koren, T. L. Koch, C Dragone, and H. M. Presby, "RITE-Net: A passive optical network architecture based on the remote interrogation of terminal equipment," *Proc. of the Optical Fiber Conference—post deadline session*, (San Jose, Calif., Feb. 20–25, 1994) pp. 43–47. This approach has several advantages, among them lower cost and higher reliability. The passive devices are also less sensitive to temperature variations, and have a robustness suitable for the uncontrolled environment of some customer locations. Additionally, wavelength routing in the network is more reliable since the upstream light is identically the same wavelength as the downstream light.

We have developed a low-cost silicon optical modulator based on micro electro mechanical systems principles (MEMS) which fulfills the foregoing objectives, e.g. a low-cost, high production volume, modulator. The device has been designated MARS, for Moving Anti-Reflection Switch.

Typically, more than 90% of the cost of a packaged photonic device can be attributed to the package itself. In addition to the problems associated with packaging electrical chips, optoelectronic chips have an additional complication of aligning a small active optical region of the active device to the small core of an optical fiber (typically of the order of 8 μm in diameter), and keeping it aligned over long term. For most photonic devices intended for telecommunications the fiber-to-device alignment tolerance is of the order of one micron. Since the MARS device is a surface normal device (light signal is normal to the plane of the optoelectronic chip) with a relatively large active area (>20 μm), various non-traditional packaging approaches can be employed that use passive techniques even for aligning to single mode optical fiber. Use of passive alignment reduces the number of high cost hand operations in manufacture, thereby reducing the major cost element.

STATEMENT OF THE INVENTION

We have developed a low cost package for interconnecting a surface normal device to an optical fiber. The package employs low cost plastic molded parts. The key feature of the package is the use of an optoelectronic device with a pyramid shape and a housing for the optoelectronic device that has a mating pyramid shape. The optical fiber is mounted in a ferrule that inserts into the molded plastic housing. When the mating pyramid parts are joined the fiber aligns precisely to the active area of the optoelectronic device. The invention is most suited to optoelectronic devices that are surface normal devices, i.e. the optical signal is incident on, emits from, or is reflected from the major plane of the device in a direction normal to the planar surface.

DETAILED DESCRIPTION

Figure 1:
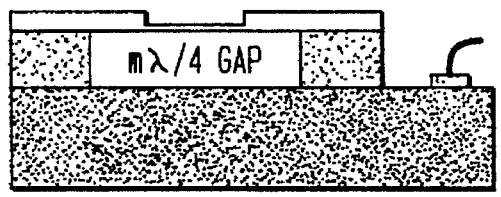
FIG. 1 is a schematic representation of the operation of a moving anti-reflection switch or MARS device showing the reflection state of the switch.

The operating principle of the MARS device is based upon the change in an air gap between a suspended film, e.g. a silicon nitride film, and the underlying substrate as seen in FIG. 1. The film has a refractive index equal to the square root of that of the substrate, and a thickness equal to ¼ of the wavelength of the incident light $\lambda_o$. In the most fundamental case, if the air gap is equal to zero (contact with the substrate), a typical anti-reflection condition is achieved. If the nitride film is suspended above the substrate by an air gap equal to $\lambda_o/4$ however, a high reflection (>70%) condition is achieved. As could be expected, this relationship would hold for any value of $m\lambda_o/4$ (m even—anti-reflection, m odd—reflecting). For a typical MARS device, an initial air gap of $3\lambda_o/4$ is used to avoid stiction problems during operation and enhance the lifetime of the devices.

Figure 2:
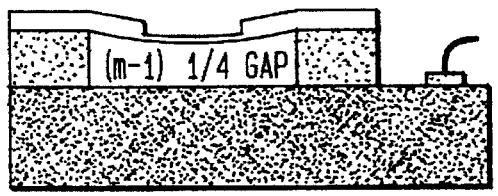
FIG. 2 is a representation similar to that of FIG. 1 showing the switch in the anti-reflecting state.

The reflecting state is illustrated in FIG. 1 and the anti-reflecting state is illustrated in FIG. 2.

Figure 3:
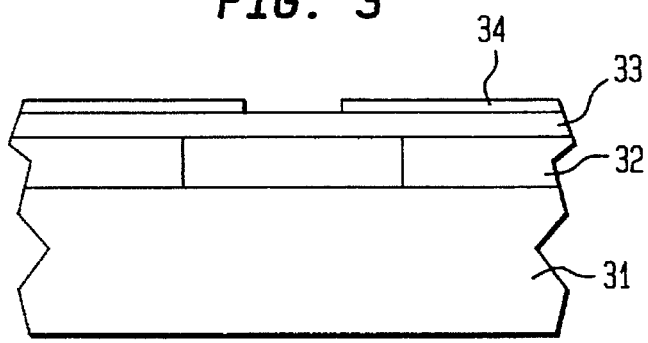
FIG. 3 is a schematic view of MARS device showing the typical film structure of the device.

The switching device is a thin film device with the basic structure shown in FIG. 3. For more details of the MARS device see K. W. Goossen, J. A. Walker, and S. C. Arney, "Silicon modulator based on Mechanically-Active Anti-Reflection layer with 1 Mbit/sec capability for fiber-in-the-loop applications," *IEEE Phot. Tech. Lett.*, vol. 6, pp. 1119–1121, September 1994. The specific embodiment described here is based on micro electro mechanical systems principles that use surface micromachining techniques to form thin film microstructures. An advantage of these techniques is the batch fabrication of several thousand chips at a time making the cost per chip extremely low (a few pennies per chip). The film structure shown in FIG. 4 consists of an n-doped silicon wafer 31, coated with a 1 μm-thick film of phosphosilicate glass (PSG) 32, a 1900 Angstrom-thick film of silicon nitride ($SiN_x$) 33, and finally a 400 Angstrom-thick metal film The metallization is typically gold, chromium, aluminum, or other suitable metal. The substrate and the top metal film serve as the electrodes to which the electrostatic driving signal is applied. The silicon nitride film is patterned into the desired configuration shown in FIG. 3 using reactive ion etching, and the PSG film under the mechanically active area 35 is removed with a sacrificial wet etch in an HF-acid based solution.

Figure 4:
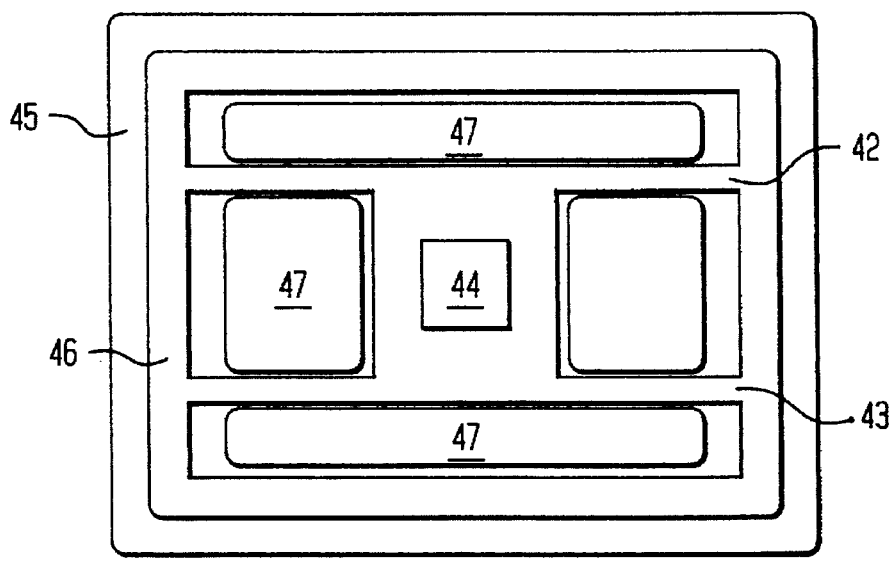
FIG. 4 is a topographical view of the device of FIG. 3.

The top view of the device of FIG. 3 is shown in FIG. 4. The geometry shown is for a device operating in the 1–2 Mbit/sec range. In this particular embodiment the mechanically active area 41 consists of a 30 μm×30 μm plate suspended by two 50 μm-long beams 42 and 43. The optical window is defined by the area 44 of the central plate without electrode material (see FIG. 3). In this device, the optical window is 22 μm×22 μm. The silicon nitride layer is visible at 45, and the electrode layer at 46. The electrode layer, formed by conventional metallization techniques, i.e. photolithographic patterning, has a tab portion 49 that extends to a bonding pad to accommodate a wire bond to one of the header pins (to be described below). The underlying substrate is visible in this view at 47. For the case of aligning a single mode optical fiber to the optical window 44, there is roughly +/−7 μm of x,y alignment tolerance. Measurements show that for a butt-coupled fiber, z-alignment tolerance is also very wide with distances between the fiber end surface and the device (metallization) surface of up to 30 μm being acceptable.

The low cost of the technology used to make the MARS device amplifies the cost of typical prior art device packages. However, with the liberal alignment tolerances just described we were able to develop a low cost molded plastic package that makes possible automated assembly of much of the device package. The keys to this low cost package are illustrated in FIGS. 5 and 6.

Figure 5:
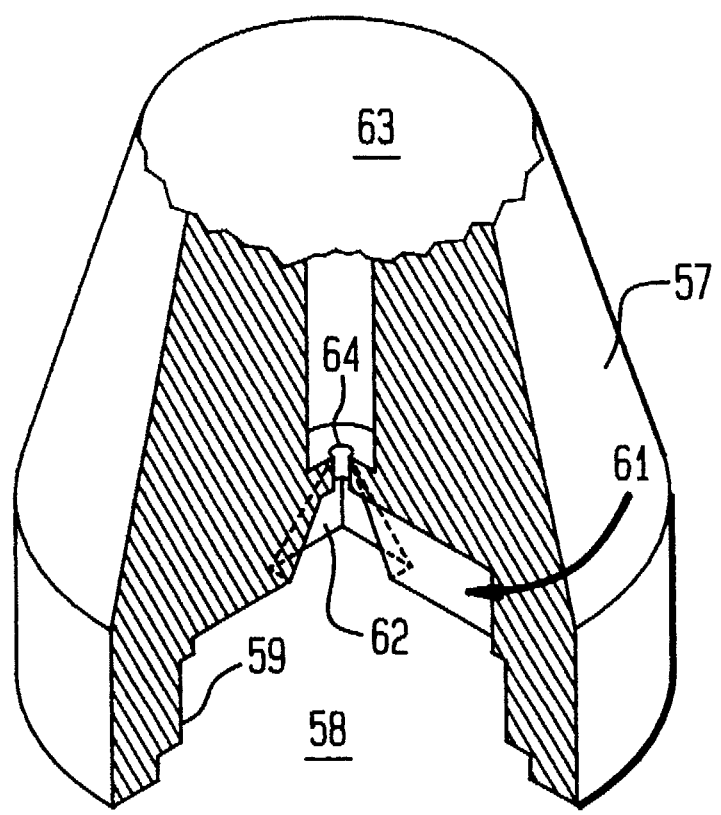
FIG. 5 is an exploded perspective view of the device package constructed according to the invention.
Figure 5:
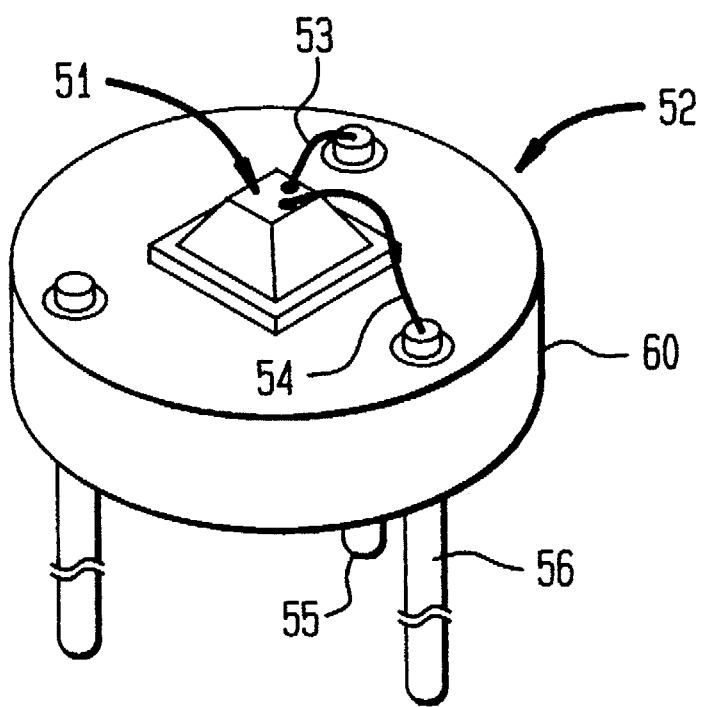

Referring to the exploded perspective view of FIG. 5 the electrooptic device is shown at 51, mounted on a standard ceramic header 52. Electrical leads 53 and 54 are bonded to the header pins 55 and 56 in the usual manner. The device and header are encapsulated with cover 57. The cover is molded from a suitable plastic material, e.g. highly filled polyphenylene sulfide or liquid crystal material, both known in the art to have good dimensional stability and low shrinkage, to form the shape shown in the figure. The molded cover has a first recessed portion shown generally at 58 for engaging the header 52. The peripheral rim 59 is adapted to engage the upper cylindrical part 60 of the header. The recess 58 has a recessed portion 61 to accommodate wire bond 54 and another recess (not shown to accommodate wire bond 53. These recesses can be seen in FIG. 6 and are designated generally as 61. The cover is also configured with a pyramid-shaped recess 62 in the center of the cover which fits over the MARS device 51. The cover has a centrally formed cylindrical bore 63 to accommodate a fiber ferrule (not shown here). The bottom of the bore 63 is shown here with a smaller bore 64 that separates the end of the fiber ferrule from the optical window of device 51. The smaller bore is optional as will be understood later. To efficiently couple light from the device 51 to the end of the fiber a spherical lens may be inserted in the small bore 64.

The pyramid shape of the device 51 and the mating pyramid-shaped recess 62 in the cover of the package combine to form an important feature of the invention. The complementary mating shapes provide passive alignment between the active window of the device 51 and the optical fiber that is to be coupled to the device. This passive alignment feature allows the device package to be assembled easily, and gives precise alignment without the necessity of precision hand operations and beam registration tools that have been required typically in assembly of prior art devices.

Figure 6:
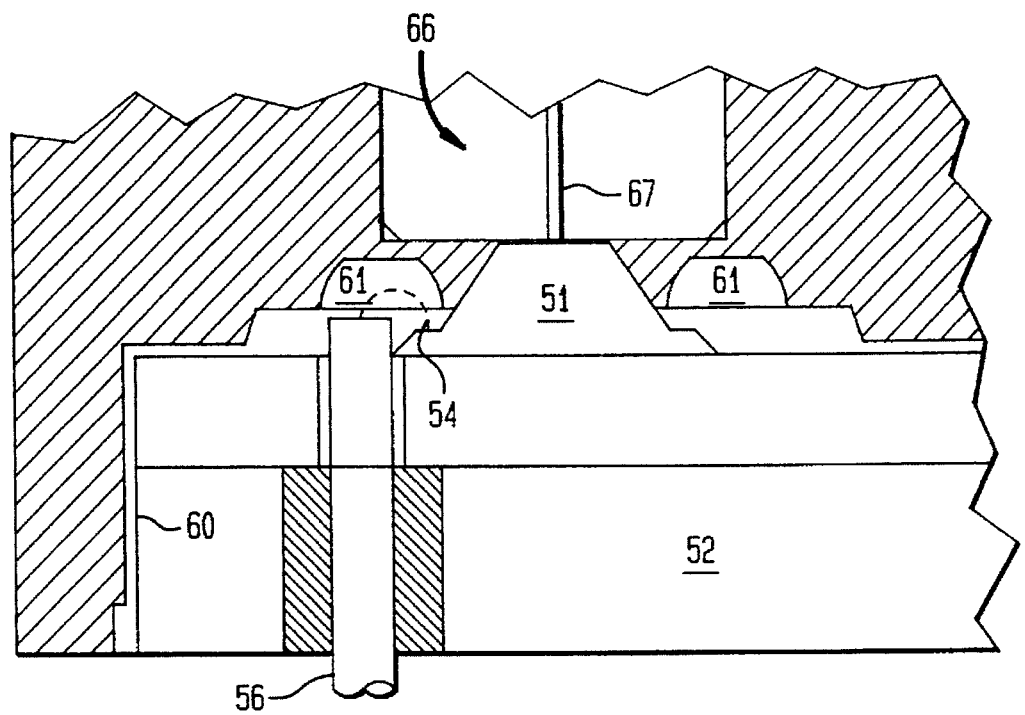
FIG. 6 is a sectional view similar to FIG. 5 showing the package configuration in greater detail.

The header and a portion of the cover of FIG. 5 are shown assembled in the cross section view of FIG. 6. The numbers designating elements in FIG. 6 correspond to the same elements shown in FIG. 5. FIG. 6 also shows suitable dimensions for these elements. The fiber ferrule 66 and the optical fiber 67 are shown inserted into the bore 63 of FIG. 5 and aligned precisely with the center of the MARS device, i.e. the active optical window of the device. As indicated earlier in connection with the description of bore 63, the added small bore 64 was described as an optional feature. In FIG. 6 the small bore section is eliminated and the large bore terminates in close proximity to the top of the device 51 as shown in FIG. 6. With the fiber ferrule inserted into the bore the end of the fiber is located in close proximity to the active region of the MARS device. The z-direction tolerance is relatively large, as stated earlier, but the gap should be maintained at 30 microns or less.

The pyramid shape of the optoelectronic device may be formed, according to another aspect of the invention, by using anisotropic etching with a crystallographic etch. The device substrate in this case is single crystal silicon. It is known that certain etchants, e.g. KOH or ethylene diamine pyrocatechol (EDP), will etch single crystal silicon preferentially along crystal planes, and if etching is continued for a sufficient duration a pyramid-shaped mesa will result. It is understood by those skilled in the art that a pyramid-shaped mesa, as shown in FIGS. 5 and 6, and described above, is technically a "truncated" pyramid shape and it will be understood also that the references herein to "pyramid shape" encompass truncated geometries since that geometry is the embodiment primarily disclosed. This phenomenon is used in this invention to form the pyramid-shaped device 51, and can also be used to form the pyramid-shaped recess 62 in cover 57. For more detail on the etch technique see K. E. Peterson, "Silicon as a Mechanical Material, *Proc. of the IEEE*, vol. 70, no. 5, pp. 420–457, May 1982.

The crystallographic etch technique is especially effective in manufacturing large batches of devices. For example, thousands of devices can be processed from a single silicon wafer. An exemplary procedure is the following. A wafer with a <100> crystal orientation and 30 mils thick is masked with 610 μm squares, and pyramids are etched using EDP. After the pyramids are formed the devices are processed to form the structure shown in FIGS. 3 and 4. With reference to FIG. 3, a 1 micron thick layer of PSG is deposited or spun on the n-doped silicon substrate, and the PSG layer is etched in an HF based etchant to form the air gaps shown in FIGS. 3 and 4. A 1900 Angstrom silicon nitride ($SiN_x$ where x is typically approximately 4/3) layer is deposited by e.g. CVD, and a 400 Angstrom layer of metal is deposited and patterned, typically by RIE, to form the metal layer shown in FIG. 4. Electrical contacts are made to complete the device.

The crystallographic etch technique can also be used in the manufacture of the cover 57. Again a batch process is advantageous. A silicon wafer is etched to form pyramids using the technique just described, and the resulting structure (without the device processing steps) is used as a master mold to form an injection mold with pyramid shapes that are identical to the shapes of the devices to be packaged. While alignment tolerances are generous in the assembly according to the invention, the alignment between the fiber end and the window 44 of FIG. 4 is still vital. This alignment can be achieved by a passive technique by forming the cover using a center alignment pin in the plastic mold. The center alignment pin forms the bore 63 of FIG. 5. The center alignment pin is centered within the silicon pyramid thus ensuring precise registration between the bore in which the fiber is positioned and the mesa of the pyramid of the active optoelectronic device.

Figure 7:
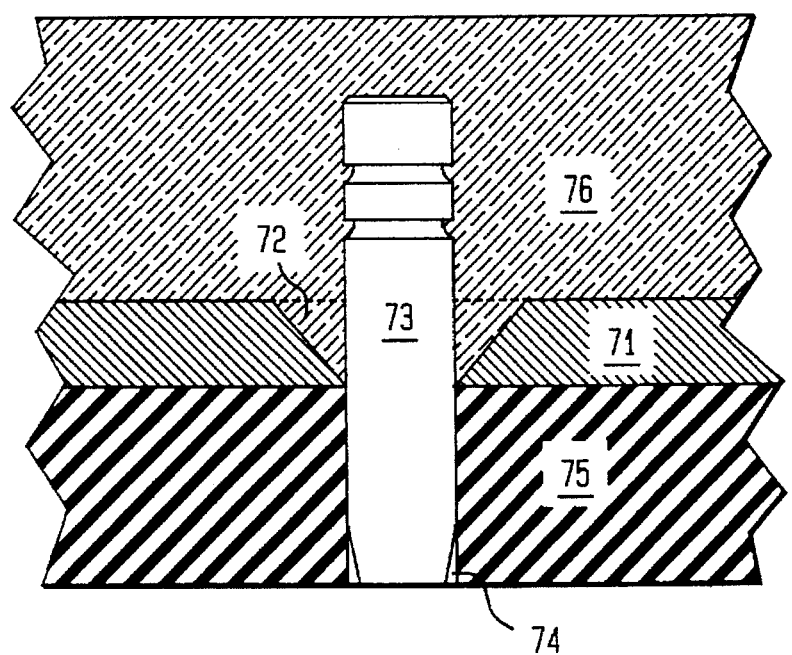
FIG. 7 is a portion of a mold used to form the cover of the device package of FIG. 5.

With reference to FIG. 7, a typical sequence of operations to achieve this is the following.

A silicon wafer 71 approximately one-half mm thick is anisotropically etched as described earlier to form pyramid shaped holes, one of which is shown at 72, through the thickness of the silicon wafer 71. To form the hole 72, a square mask with 1.5 mm sides will produce a square opening on the opposite side of the wafer with approximately 0.6 mm sides. This shape is complementary to the shape of the pyramid on the support member 51 of FIG. 6. A 0.6 mm steel gage pin 73 is snug fitted into a 0.6 mm hole 74 formed in stainless steel plate 75. Electroformed nickel 76 is then formed over the silicon layer 71 and the pin 73 to form the structure shown in FIG. 7. At this point the stainless steel plate 75 is removed leaving pin 73 in place, and the silicon layer 72 is etched away. The resulting mold is shaped to form the pyramid of the cover, with a bore formed in the precise center of the mold to accommodate and precisely register the fiber with the device window when these components are later assembled. The mold portion shown in FIG. 7 is a portion of the bottom half of the mold for the cover. The top half of the mold (not shown) simply has the conical shape of the cover as appearing in FIG. 5. It also has a form for a center bore that fits over centering pin 73 of FIG. 7. This form for the center bore has a diameter equal to the ferrule diameter, i.e. the diameter of the opening 66 in FIG. 6, which in our embodiment is approximately 2.5 mm.

The molded plastic package has been described herein as tailored for a MARS device, and that embodiment is a preferred form of the invention. However, the package may be used to contain other kinds of optoelectronic devices in which precise alignment between an optical fiber and an optical receiver, source, or modulator is required. As indicated previously, the package of this invention is most useful with surface normal optoelectronic devices.

The invention has been described in terms of a silicon substrate and silicon optoelectronic devices. Recognizing that the main support structure in this package is silicon to facilitate the crystallographic etch technique to form the pyramid shaped support for the optoelectronic device itself, it will occur to those skilled in the art that various forms of hybrid structures can also be used thus allowing flexibility in the choice of material for the optoelectronic device. In particular, gallium arsenide devices are widely used in lightwave technology. In the case of a MARS device, the electrical function of the device does not require a semiconductor material and a wide variety of materials for the device substrate are possible. For other forms of optical modulators, crystal materials like lithium niobate could be used. In each of these cases the active device itself can be mounted or bonded on a silicon substrate to obtain the advantages of this invention.

Various additional modifications of the invention may be made by those skilled in the art. All variations that basically rely on the teachings through which this invention has advanced the art, or the equivalents of those variations, are properly considered within the scope of this invention.

We claim:

1. Packaged optoelectronic device comprising:
   a. an optoelectronic device formed on a silicon substrate, said substrate having a pyramid shape,
   b. a molded plastic cover overlying said pyramid-shaped optoelectronic device, said cover having a pyramid-shaped recess located in the center of the inside of the cover, the pyramid-shaped recess mating with the pyramid-shaped optoelectronic device, a bore-shaped opening with a length extending through said cover from the outside of the cover to said pyramid-shaped recess, and an optical fiber mounted in said bore and extending from a position adjacent the active surface of the optoelectronic device through said length of the cover.

2. The device of claim 1 in which the optoelectronic device is a surface normal device.

3. The device of claim 2 in which the position adjacent the active surface of the device is within 30 microns of said surface.

4. The device of claim 3 in which the optoelectronic device is an optical modulator.

5. The device of claim 4 in which the optical modulator is a mechanical anti-reflection switch.

6. The device of claim 3 in which the optical fiber is fixed within a ferrule, the ferrule having a length at least as long as the length of said bore, and the ferrule is mounted in said bore.

7. The device of claim 1 in which the optoelectronic device is mounted on a ceramic header and the said cover extends over both the device and the ceramic header.

* * * * *